United States Patent [19]

Pfleger

[11] Patent Number: 5,588,468
[45] Date of Patent: Dec. 31, 1996

[54] BLOW-MOLDED COOLANT CONDUIT

[75] Inventor: Wolfgang Pfleger, Tamins, Switzerland

[73] Assignee: EMS-Inventa AG, Zürich, Switzerland

[21] Appl. No.: 617,309

[22] Filed: Mar. 18, 1996

Related U.S. Application Data

[63] Continuation of Ser. No. 360,321, Dec. 21, 1994, abandoned.

[30] Foreign Application Priority Data

Dec. 23, 1993 [DE] Germany ............................ 9319880 U

[51] Int. Cl.⁶ ...................................................... F16L 11/11
[52] U.S. Cl. ........................... 138/121; 138/137; 138/141;
138/DIG. 7
[58] Field of Search ...................................... 138/121, 137,
138/141, DIG. 7

[56]  References Cited

U.S. PATENT DOCUMENTS

| | | | |
|---|---|---|---|
| 3,315,704 | 4/1967 | Shire ........................................ | 138/121 |
| 3,540,488 | 11/1970 | Voorhees ................................. | 138/121 |
| 3,561,493 | 2/1971 | Maillard et al. ........................ | 138/137 |
| 4,101,699 | 7/1978 | Stine et al. .............................. | 138/DIG. 7 |
| 4,129,472 | 12/1978 | Hobes et al. ............................ | 138/DIG. 1 |
| 4,229,333 | 10/1980 | Wolff et al. ........................ | 260/23.7 M |
| 4,424,834 | 1/1984 | Sumi et al. .............................. | 138/137 |
| 4,632,959 | 12/1986 | Nagano ...................................... | 525/70 |
| 4,900,612 | 2/1990 | Sato et al. ................................. | 428/216 |
| 5,284,184 | 2/1994 | Noone et al. ........................... | 138/121 |
| 5,313,987 | 5/1994 | Röber et al. ............................. | 138/137 |

FOREIGN PATENT DOCUMENTS

| | | |
|---|---|---|
| 428834A2 | 3/1991 | European Pat. Off. . |
| 436923A2 | 7/1991 | European Pat. Off. . |
| 53-105563 | 9/1978 | Japan . |
| 63-158382 | 7/1988 | Japan . |
| 4224384 | 8/1992 | Japan . |
| WO89/04755 | 6/1989 | WIPO . |

*Primary Examiner*—David Scherbel
*Assistant Examiner*—James F. Hook
*Attorney, Agent, or Firm*—Spencer & Frank

[57]  ABSTRACT

A coolant conduit, which is an elongate tubular article for an apparatus requiring cooling by a cooling agent, includes a plurality of layers which are provided by, in combination, discharging a co-axial melt hose, 3D tubing manipulation, and blow molding thereof, each layer of the plurality being composed of a polymeric material which is thermoplastically processable. The plurality of layers preferably includes at least one inner layer which is composed of a polymeric material which is substantially inert to the cooling agent and which is substantially non-swelling; and an outer layer which is composed of at least one polyamide and which has a high pressure resistant which conveys a high bursting strength.

13 Claims, 1 Drawing Sheet 5,588,468

BLOW-MOLDED COOLANT CONDUIT

This application is a Continuation of application Ser. No. 08/360,321, filed Dec. 21, 1994 (now abandoned).

CROSS-REFERENCE TO RELATED APPLICATION

The present application claims the right of foreign priority with respect to Application No. G 93 19 880.9 filed in Germany on Dec. 23, 1993, the subject matter of which is incorporated herein by reference.

BACKGROUND OF THE INVENTION

1. Field of the Invention

The invention relates to a coolant conduit comprising a plurality of polymer layers that has a high resistance to hydrolysis and a high pressure resistance which conveys a high bursting strength. In particular, the invention relates to a coolant conduit which is an elongate tubular article for an apparatus such as as engine, especially a motor vehicle engine.

2. Description of the Related Art

Coolant conduits are not simple in form as a rule but rather are more likely to have bizarre shapes. They are often constructed of metal parts and elastic adaptors to compensate for the sometimes intense vibration of the motor. In accordance with the prior art, rubber coolant conduits reinforced with woven fibers (textiles) have been used for this purpose. Such rubber conduits have been preferably used for vehicle engines, but have the disadvantage that they are relatively expensive and, despite this, do not completely fulfill the requirements made of them, particularly with respect to stability at high temperatures, such as the high temperatures arising in an engine compartment. The mechanical properties of such rubber coolant conduits deteriorate sharply after a period of operation equivalent to approximately 100,000 km traveled. Stability of rubber coolant conduits will become even more critical for future automobile engines, which allow the temperatures in the engine compartment to rise even higher than before, thus accelerating deterioration in the mechanical properties of such rubber coolant conduits.

Coolant conduits made of a single polymer layer, so-called "monotubes", have thus far found only limited opportunities for use. At temperatures above 100° C., monotubes made of polyolefins exhibit an inadequate pressure resistance. At temperatures above 100° C., monotubes made of polyamides exhibit a reduced resistance to hydrolysis.

For this reason, polyamides reinforced with glass fibers have been used for parts that come into direct contact with coolant since the glass fibers can partly compensate for the loss of mechanical properties of the polyamides, for instance from swelling. Glass fiber reinforced tubes are not flexible, however.

Simple, tubular, multilayer coolant conduits are known and have been made by coextrusion in accordance with European Patent No. 0 436 923 A2, the disclosure of which is incorporated herein by reference. These coolant conduits are flexible but have only limited opportunities for use because of their shape. They are especially suitable for use as adaptors.

It is therefore an object of the present invention to create a coolant conduit that does not have the forenamed disadvantages.

SUMMARY OF THE INVENTION

This object is accomplished by the present invention which provides a coolant conduit which is an elongate tubular article for an apparatus requiring cooling by a cooling agent, comprising a plurality of layers which are provided by, in combination, discharging a co-axial melt hose, 3D tubing manipulation, and blow molding thereof, each layer of the plurality being comprised of a polymeric material which is thermoplastically processable.

The plurality of layers may advantageously comprise at least one layer which is comprised of a polymeric material which is substantially inert to the cooling agent and which is substantially non-swelling; and an outer layer which is comprised of at least one polyamide and which is pressure resistant.

The polymeric material of the inner layer and the at least one polyamide of the outer layer advantageously each have respective flexibilities, which flexibilities differ substantially.

The inner layer is advantageously comprised of a polymeric material which is at least one polymer selected from the group consisting of homopolyolefins and copolyolefins, which at least one polymer may be halogenated or nonhalogenated, and which at least one polymer is provided with functional groups that cause it to be compatible with the outer layer. As used hereinabove and throughout, "at least one" is intended to include the named materials, blends thereof, mixtures thereof, and mixtures of blends. For example, in the foregoing, "at least one polymer" is intended to mean that each layer of the at least one inner layer is comprised of polymeric material that may be a homopolyolefin, a blend of homopolyolefins, a copolyolefin, a blend of copolyolefins, and mixtures of any of the foregoing.

The inner layer may advantageously be comprised of at least one polymer selected from the group consisting of polyolefins having grafted α-unsaturated dicarboxylic acids or their derivatives, and copolyolefins having grafted α-unsaturated dicarboxylic acids or their derivatives, and then the inner layer is compatible with the outer layer.

The inner layer may advantageously be comprised of a polymeric material which is at least one polymer selected from the group consisting of homopolyolefins and copolyolefins, which at least one polymer may be halogenated or nonhalogenated, and is not compatible with the outer layer, and then the coolant conduit further comprises an intermediate layer which is compatible with the inner layer and with the outer layer, and which is disposed between the inner layer and the outer layer.

In another embodiment of the invention, one layer selected from the group consisting of (a) the inner layer and (b) the intermediate layer may be comprised of at least one olefin selected from the group consisting of polyolefins and copolyolefins, which at least one olefin is provided with functional groups by means of one of grafting or copolymerization.

The inner layer may advantageously be comprised of at least one polymer selected from the group consisting of (a) homopolyolefins which are one of chlorinated or fluorinated, (b) copolyolefins which are one of chlorinated or fluorinated, and (c) PVC.

The at least one inner layer may be comprised of at least one polymer selected from the group consisting of ETFE (ethylene-tetrafluoroethylene copolymer), PTFE (propylene-tetrafluoroethylene copolymer), PVDF (polyvinylidene fluoride), PPS (polyphenylene sulfide), PPE (polypropyleneether), POM (polyoxymethylene), EVOH (hydrolyzed ethylene-vinyl acetate copolymer), and EVA (ethylene-vinyl acetate copolymer).

The outer layer is comprised of at least one polyamide selected from the group consisting of homopolyamides and copolyamides. The homopolyamides or copolyamides of the at least one polyamide comprise units of at least one monomer selected from the group consisting of (a) linear aliphatic monomers having from 6 to 12 carbon atoms, (b) aromatic monomers having from 6 to 12 carbon atoms, and (c) cycloaliphatic monomers having from 6 to 20 carbon atoms.

The coolant conduit has a total wall thickness, and the outer layer has a wall thickness which ranges from about 10% to about 95% of the total wall thickness, preferably from about 25% to about 95% of the total wall thickness.

Preferably, the coolant conduit has a wall including at least one non-corrugated longitudinal section and at least one corrugated longitudinal section which is corrugated with one of annular-shaped corrugation or spiral-shaped corrugation. When used as coolant conduits for engines, especially motor vehicle engines, conduits that, at least in some portions, have an annularly or spirally corrugated wall are especially suitable.

In a preferred embodiment, the plurality of layers has a wall thickness ratio which varies over the length of the coolant conduit, the coolant conduit having a length and each layer of the plurality of layers having a respective wall thickness.

DESCRIPTION OF THE PREFERRED EMBODIMENTS

Figure 1:
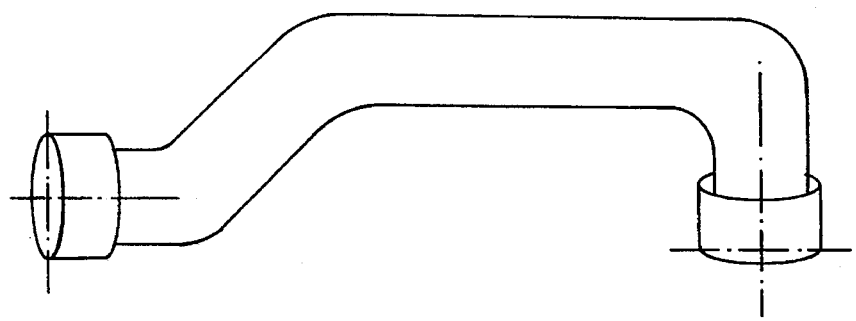
FIG. 1 is a plan side view of a coolant conduit according to the invention which has an arbitrary shape.

It has been discovered that multilayer conduits with a combination of differently-acting layers of suitable polymers are particularly suitable for use as coolant conduits. That is, coolant conduits having at least one inner layer that is inert to and does not swell in cooling agents, and having an outer layer which is rigid and load-bearing, and has a high pressure resistance affording high bursting strength, have been found to be particularly suitable. Such layers must be compatible with each other, or must be joined by an intermediate layer positioned between the at least one inner and outer layers which is compatible with both the at least one inner layer and the outer layer in order to provide suitable joining, i.e., adhesion, of the layers to one another so that the layers do not delaminate.

Coolant conduits according to the invention are preferably produced by (a) discharging a co-axial melt hose of the various layers from the various polymers to provide a tubing preform (parison), (b) placement of the tubing preform (parison) in an arbitrary mold, known in the art as "3D tubing manipulation", and (c) blow molded. All of these techniques are well known in the art.

Especially preferable are multilayer coolant conduits with a polyolefin inner layer and a polyamide outer layer. Excellent resistance to hydrolysis is assured because the polyolefin inner layer does not swell in the coolant which may be, for example, water or an aqueous glycol solution (antifreeze). Excellent pressure resistance affording high bursting strength is provided by the polyamide outer layer and makes it possible to reach the qualities demanded by automobile manufacturers. Thus, textile reinforcement of coolant conduits as used in rubber coolant conduits of the prior art is no longer required and can be dispensed with.

The coolant conduits according to the invention are distinguished in that their layers advantageously comprise polymers with markedly differing flexibility, either inherently or by modification as is known in the art, and in that the flexibility of the conduits can be varied further by means of intermittently different wall thickness proportions of the layers.

The conduits according to the invention are substantially more flexible than the reinforced rubber conduits of the prior art. Experience has shown that bending of smooth, i.e., non-corrugated, cylindrical conduits, lines, tubes, or pipes made of solid polymeric materials causes kinking at relatively large diameters.

Coolant conduits whose walls have been at least partially corrugated by any well known method of the prior art, e.g., into annular-shaped or spiral-shaped corrugations, have an especially advantageous flexibility that permits even pronounced curvatures in a tight or narrow space.

Additional advantages of conduits according to the invention include reduced weight and reduced costs for production.

Polyamides are materials which are particularly suitable for the outer layer, which must be pressure resistant and afford high bursting strength. Preferable homopolyamides or copolyamides include those made of (a) linear aliphatic monomers with from 6 to 12 carbon atoms, such as lactams, aminocarboxylic acids, or diamines and dicarboxylic acids, (b) aromatic monomers with from 6 to 12 carbon atoms, such as alkylated or nonalkylated aromatic diamines or dicarboxylic acids, and (c) cycloaliphatic monomers, such as alkylated diamines or dicarboxylic acids, with from 6 to 20 carbon atoms with one or more cyclohexane rings which can be joined via alkylene groups. Examples that may be named are the semicrystalline polyamides of the series PA 6 through PA 12, and the series PA 6,6 through PA 6,12, and PA 12,6 through PA 12,12. Also suitable are highly viscous PA 6 or 12 to PA 6,12, and PA 12,6 to PA 12,12. Blends, mixtures, and mixtures of blends of these polyamides are also suitable, with grades having high viscosities.

Inert, swelling-resistant polymers for the inner layer include halogenated or nonhalogenated homopolyolefins or copolyolefins, and their mixtures or blends. Besides homopolyolefins, the copolyolefins of ethylene or propylene with further α-olefins are preferred. Chlorinated, but also especially fluorinated, polyolefins and copolyolefins, and also polyvinyl chloride, PVC, are suitable. Blends of polyolefins and crosslinked or partially crosslinked elastomers are especially advantageous. For two-layer conduits, the homopolyolefins or copolyolefins must themselves have reactive groups that make them compatible. This can be attained, for instance, by grafting the olefins with α-unsaturated acids or their derivatives, or by copolymerization with suitable comonomers, such as acrylic or methacrylic acids or their derivatives.

The inner layer preferably comprises polymers of the group including ETFE, PTFE, PVDF, PPS, PPE, POM, EVOH, EVA, PBT, and blends thereof.

The inner layer may, however, also be adequately firmly joined to the outer layer by providing an intermediate layer that is compatible with both of them. For this purpose, polyolefins or copolyolefins that have reactive groups, especially carboxyl or acid anhydride groups obtained by grafting or by the aforementioned comonomers, are especially suitable.

The proportion of burstproof outer layer ranges from about 10 to about 95%, preferably about 25% to about 95% of the total wall thickness.

A very particularly preferred embodiment of the coolant conduit according to the invention comprises an inner layer of maleic acid-grafted polyolefin or copolyolefin and an outer layer of high-viscosity polyamide 6 or polyamide 12 in the outer layer of the corrugated longitudinal section. The coolant conduits according to the invention may exhibit virtually any shape, even arbitrary shapes, since almost any variation in flexibility or burst resistance may be provided for through the combination of suitable flexible material for the inner layer and rigid material for the outer layer, which, moreover, can intentionally have different thickness ratios values from one portion to another. In the corrugated regions, corrugation can improve the flexibility even further and to a considerable extent.

The relative seamlessness of the blow-molded conduit and the low proportion of waste material, which is limited to the end pieces (slugs), are particularly advantageous.

The invention will be described below by way of example, in conjunction with the drawing.

Figure 2:
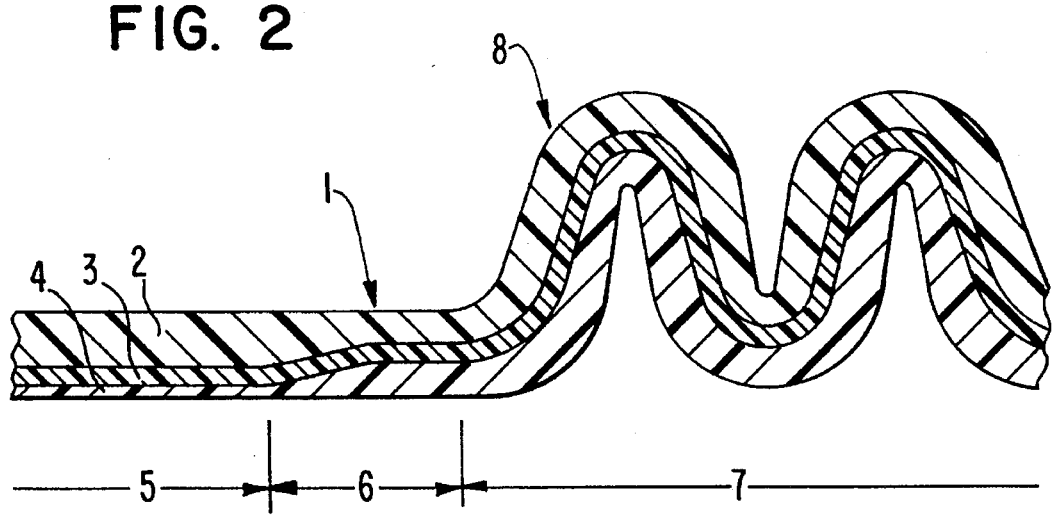
FIG. 2 is a partial longitudinal section through a three-layer coolant conduit according to the invention.

FIG. 1 is a plan side view of an arbitrarily shaped coolant conduit according to the invention. FIG. 2 shows a partial longitudinal cross section through a coolant conduit 1 according to the invention which has three layers: outer layer 2, intermediate layer 3, and inner layer 4. Outer layer 2 is burst resistant and is joined to intermediate layer 3 which is adhesion promoting and which is additionally joined to layer 4. Inner layer 4 is flexible and solvent-inert. Coolant conduit 1, moreover, has a rigid longitudinal section 5, a semiflexible longitudinal section 6, and a flexible longitudinal region 7 which is provided with corrugation 8. Corrugation may have an annular shape or a spiral shape as is known in the art.

In a preferred embodiment, the outer layer 2 of the coolant conduit 1 is composed of a polyamide that has the requisite rigidity and at the same time the appropriate burst resistance. The inner layer 4 is composed of a highly flexible polymer and, particularly a polymer which is inert to coolant, such as antifreeze, and is preferably a polyolefin.

The wall thickness ratio between the inner layer 4 and the outer layer 2 defines the flexibility. In a semiflexible region, such as semiflexible longitudinal section 6, the flexible inner layer 4 has an increased wall thickness and, as a result, a correspondingly reduced bending rigidity. The wall thickness of the outer layer 2 in section 6 is shown as being reduced to maintain the total wall thickness of the coolant conduit 1 the same. Corrugation 8 produces great flexibility in flexible section 7 and presents the opportunity to bend the coolant conduit 1 around short radii when appropriate. The burst resistance is defined by the corrugated section 7. A major advantage of the coolant conduit 1 according to the invention resides in the fact that very rigid regions 5 and flexible regions 7, which can absorb the vibrations between the engine and the body of the vehicle, alternate. When 3D tubing manipulation is employed, moreover, this coolant conduit construction is not weakened in any region by a crimped seam.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A coolant conduit which is an elongate tubular article for an apparatus requiring cooling by a cooling agent and which is blow molded, consisting essentially of:

a plurality of layers which are provided by, in combination, discharging a co-axial melt hose, 3D tubing manipulation, and blow molding thereof, each layer of the plurality being comprised of a thermoplastic polymeric material which is thermoplastically processable, wherein the plurality of layers comprises:

at least one inner layer which is comprised of a polymeric material which is substantially inert to the cooling agent, which is substantially non-swelling, and which is at least one polymer selected from the group consisting of homopolyolefins and copolyolefins, which at least one polymer may be halogenated or nonhalogenated, and which at least one polymer is provided with functional groups that cause it to be compatible with the outer layer; and an outer layer which is comprised of at least one polyamide and which is pressure resistant.

2. The coolant conduit according to claim 1, wherein the polymeric material of the at least one inner layer and the at least one polyamide of the outer layer each have respective flexibilities, which flexibilities differ substantially.

3. The coolant conduit according to claim 1, wherein the at least one inner layer is comprised of at least one polymer selected from the group consisting of polyolefins having grafted α-unsaturated dicarboxylic acids or their derivatives, and copolyolefins having grafted α-unsaturated dicarboxylic acids or their derivatives, and wherein the at least one inner layer is compatible with the outer layer.

4. The coolant conduit according to claim 1, wherein the plurality of layers further comprises an intermediate layer which is compatible with the at least one inner layer and with the outer layer, and which is disposed between the at least one inner layer which is adjacent the outer layer and the outer layer.

5. The coolant conduit according to claim 4, wherein one layer selected from the group consisting of (a) the at least one inner layer and (b) the intermediate layer is comprised of at least one olefin selected from the group consisting of polyolefins and copolyolefins, which at least one olefin is provided with functional groups by means of one of grafting or copolymerization.

6. The coolant conduit according to claim 1, wherein the outer layer is comprised of at least one polyamide selected from the group consisting of homopolyamides and copolyamides.

7. The coolant conduit according to claim 6, wherein the homopolyamides or copolyamides of the at least one polyamide comprises units of at least one monomer selected from the group consisting of (a) linear aliphatic monomers having from 6 to 12 carbon atoms, (b) aromatic monomers having from 6 to 12 carbon atoms, and (c) cycloaliphatic monomers having from 5 to 20 carbon atoms.

8. The coolant conduit according to claim 1, wherein the coolant conduit has a total wall thickness, and wherein the outer layer has a wall thickness which ranges from about 10% to about 95% of the total wall thickness.

9. The coolant conduit according to claim 8, wherein the outer layer has a wall thickness which ranges from about 25% to about 95% of the total wall thickness.

10. The coolant conduit according to claim 1,
    wherein the coolant conduit has a length,
    wherein each layer of the plurality of layers has a wall thickness, and
    wherein the plurality of layers has a wall thickness ratio which varies over the length of the coolant conduit.

11. The coolant conduit according to claim 1, wherein the coolant conduit has a wall including at least one noncorrugated longitudinal section and at least on one corrugated longitudinal section which is corrugated with one of annular-shaped corrugation or spiral-shaped corrugation.

12. A coolant conduit which is an elongate tubular article for an apparatus requiring cooling by a cooling agent and which is blow molded, consisting essentially of:
    a plurality of layers which are provided by, in combination, discharging a co-axial melt hose, 3D tubing manipulation, and blow molding thereof, each layer of the plurality being comprised of a thermoplastic polymeric material which is thermoplastically processable,
    wherein the plurality of layers comprises:
        at least one inner layer comprised of a polymeric material which is substantially inert to the cooling agent, which is substantially non-swelling, and which is comprised of at least one polymer selected from the group consisting of (a) homopolyolefins which are one of chlorinated or fluorinated, (b) copolyolefins which are one of chlorinated or fluorinated, and (c) PVC, and which at least one polymer is provided with functional groups that cause it to be compatible with the outer layer; and
        an outer layer which is comprised of at least one polyamide and which is pressure resistant.

13. A coolant conduit which is an elongate tubular article for an apparatus requiring cooling by a cooling agent and which is blow molded, consisting essentially of:
    a plurality of layers which are provided by, in combination, discharging a co-axial melt hose, 3D tubing manipulation, and blow molding thereof, each layer of the plurality being comprised of a thermoplastic polymeric material which is thermoplastically processable,
    wherein the plurality of layers comprises:
        at least one inner layer comprised of a polymeric material which is substantially inert to the cooling agent, which is substantially non-swelling, and which is comprised of at least one polymer selected from the group consisting of ETFE, PTFE, PVDF, PPS, PPE, EVOH, PBT and EVA, and which at least one polymer is provided with functional groups that cause it to be compatible with the outer layer: and
        an outer layer which is comprised of at least one polyamide and which is pressure resistant.

* * * * *